Patented Oct. 18, 1949

2,484,860

UNITED STATES PATENT OFFICE 2,484,860

CHEWING GUM

Walter O. Snelling, Allentown, Pa.

No Drawing. Application December 18, 1947,
Serial No. 792,624

6 Claims. (Cl. 99—135)

My invention relates to improvements in chewing gum, and more particularly relates to an improved chewing gum composition. The principal object of my invention is to provide a chewing gum that will not only retain a pleasant flavor longer than chewing gum made from any chewing gum base at present known, but one that will show more uniform taste over the period that it is masticated.

This application relates to the same class of products as those described and claimed in my pending application S. N. 788,968, filed November 29, 1947. This pending application describes a chewing gum base and finished chewing gum using 1-alkoxy-2-amino-4-nitrobenzenes as sweetening agent. The present application relates to such products containing 1-halogeno-2-amino-4-nitrobenzenes.

The 1-halogeno-2-amino-4-nitrobenzenes have sweetness and high solubility in chewing gum base and exceptionally low solubility in saliva. Both the 1-fluoro and the 1-iodo derivatives have therapeutic properties, the 1-fluoro-2-amino-4-nitrobenzene affording a supply of fluorine to the mouth in a very regular and long-continued dosage under conditions that are believed to be beneficial to the teeth and to reduce the incidence of dental caries, and the 1-iodo-2-amino-4-nitrobenzenes similarly affording the body an excellent source of iodine. The 1-bromo-2-amino-4-nitrobenzene appears to have both sedative and analgesic effects, but this has not yet been conclusively established.

Although commercial chewing gums vary widely in their composition, nearly all of the commercial production of chewing gum consists of a mixture of a water insoluble masticatory base and water soluble flavoring agents, the water insoluble base constituting about 20% of the mixture (with a normal range of from 15% to 22%) and the water soluble flavoring agents constituting from 78% to 85% of the mixture. The water insoluble masticatory base may consist of chicle alone, or of a natural rubber such as pontianak, or of a rubber which has been treated by mechanical or chemical action or by a combination of these two effects, until its "rubberiness" has been suitably modified to give it the desired masticatory characteristics. Softeners are often added, and these materials are water insoluble and when used form a component part of the masticatory base.

Since commercial chewing gum is a mechanical combination of readily water soluble flavoring agents and water insoluble masticatory base, its composition changes rapidly when it is first chewed, and in a matter of a few minutes (usually not longer than five minutes), the flavoring agents are mostly removed from the mixture, leaving only the almost flavorless masticatory base. Careful tests have indicated that most of the commercial chewing gums have a very pleasant and sweet taste that continues almost unchanged for a period of about five minutes, when the taste begins to drop off sharply, and after being chewed for about 10 minutes, the water soluble flavoring agents have been substantially removed from the mixture, which thereafter may continue to give a pleasant sensation when chewed, but which is almost flavorless. An effort has been made to produce chewing gums which have a longer period of taste by adding to the masticatory base difficultly soluble oils and resins, and although these somewhat extend the period over which the masticatory base has a flavor, this flavor is not as pleasant as that of the water soluble flavoring agents, and to some persons is not pleasant at all.

I have discovered that when a halogenoaminonitrobenzene is incorporated with either natural chicle or any of the water insoluble chicle substitutes of the usual commercial types, it dissolves in these materials readily and completely, and when so dissolved shows so great a solution affinity for the masticatory base and so feeble a solution affinity for saliva, that it is given up to the saliva extremely slowly, so that chewing gum made in accordance with my present invention often gives a pleasant flavor for a period that may be 10 times as long as the period in which conventional chewing gums lose their flavor, and which in some tests has been found to be more than 30 times as long as the sweet initial flavor of conventional chewing gums is retained.

As already mentioned, in conventional chewing gums the amount of masticatory base usually represents about 20% of the weight of the finished gum, and the flavoring agents constitute about 80% of the weight of the finished gum. Gum made in accordance with my present invention not only reverses these proportions, but may actually employ considerably smaller amounts of flavoring agent, but still with the production of great and long-continued flavoring effect.

As an example of my invention, I may use a mechanical mixture of 90 parts of any of the usual chicle or chicle-substitute masticatory bases, with 10 parts of a halogenoaminonitrobenzene, and although this mixture will not be as sweet when initially chewed as a conventional chewing gum containing 80% of a mixture of sugar and corn syrup and 20% of masticatory base, after being chewed for ten to fifteen minutes it has a sweetness and flavor fully equal, if not superior, to most commercial chewing gums. From this point on, its superiority over conventional chewing gums is outstanding because the commercial chewing gum loses practically all of its flavor when chewed for an additional period of ten minutes, whereas my new product continues to show practically the same sweetness and flavor for an additional period of chewing of from one to three hours.

By careful tests I have proven that this most important result is due to the quite remarkable and unexpected result of the relative solubility distribution of the halogenoaminonitrobenzenes in rubber-like hydrocarbons and in saliva. The halogenoaminonitrobenzenes have such a strong affinity for the rubber-like hydrocarbons that constitute the water insoluble portions of chicle and of chicle substitutes that they tend to remain dissolved in this material. At the same time their solubility in saliva is low, and therefore they tend to remain preferentially in the masticatory base. Possessing great sweetening power, however, even the minute amounts that are continually dissolved in the saliva as the result of equilibrium conditions gives the masticatory base a pleasant, lasting sweet taste, which continues almost undiminished for several hours, and which even then drops off very slowly.

Efforts have been made by others to increase the period over which conventional chewing gums retain their sweet flavor, but it has been found that by doubling the quantity of water-soluble flavoring agent, the period of sweetness is not substantially lengthened. It is true that for the first few moments of chewing the sweet taste is intensified, but the water solubility of the flavoring agents causes them, in whatever quantity they are present, to dissolve very rapidly in the saliva, since they are substantially insoluble in the rubber-like hydrocarbons of the masticatory base, and they are very soluble in saliva.

The product resulting from the solution of a halogenoaminonitrobenzene in a rubber hydrocarbon represents just the opposite of this condition, and the halogenoaminonitrobenzenes have not only high solubility in the hydrocarbons of the masticatory base, but tend to be "fixed" and very firmly held therein. Their solubility in water is very low, and accordingly, as the masticatory base is chewed for a long period of time, the amount of flavoring agent that passes into the saliva is extremely minute, and tends to become uniform as a consequence of the high retaining power of the masticatory base and low solubility in the saliva. As a result of their high initial flavoring power, however, even the amount of the halogenoaminonitrobenzenes that are slowly set free as the result of their solubility equilibrium condition in the two immiscible mediums, gives my new chewing gum base and chewing gums made from it, a satisfactory flavor over a period of many times the maximum period that other chewing gums have a pleasant flavor, and give this pleasant flavor almost uniformly over a period of hours of mastication.

The result that is achieved in the practice of my invention is impossible to achieve by any of the usual expedients of adding greater quantities of flavoring agent to a masticatory base, and in the practice of my invention I obtain a better flavor from the use of a halogenoaminonitrobenzene in an amount equal to 10% or less of the weight of my masticatory base than others have been able to obtain by the use of water soluble flavoring agents in an amount equal to 400% of the weight of their masticatory base. This means that in flavoring ability, I obtain a vastly improved result from a very much smaller quantity of flavoring agent. I believe that the taste buds of the mouth are dulled or partially deactified by the intensely sweet taste that is produced in the first few minutes of chewing conventional chewing gum, so that the sensation of taste of the person chewing the gum is not in any way proportional to the amount of sweetening agent that is present, and this is borne out by the fact that although chemical tests indicate that the amount of sweetening agent that is dissolved from conventional chewing gum in the third minute of chewing is considerably less than half of the amount that is dissolved in the first minute of chewing, relatively little difference in taste is noted in these two periods. This means that in conventional chewing gum a large amount of sweetening agent is wasted because it must be present in great excess in the first few minutes of the gum being chewed, in order that any may be present after the gum has been chewed for from four to six minutes. Chewing gum made in accordance with my invention shows materially greater sweetness and flavor after being chewed for two hours than conventional chewing gums show after being chewed for eight minutes, and this result is clearly due to the greater efficiency that I obtain in the actual utilization of the flavoring agent that I employ. It is true that the halogenoaminonitrobenzenes are known to be very sweet bodies, but the flavor that I obtain from them in the practice of my present invention is entirely out of proportion to the effect that would be produced if a chewing gum were to be made containing sugar and corn syrup of equal sweetening power. Such a chewing gum would be intensely sweet when first chewed, but would still be almost flavorless after being chewed for five minutes, and would no longer taste sweet after being chewed for ten minutes, whereas my products retain a very pleasant sweetness after being chewed for six or more hours. By chewing a conventional chewing gum for a period of twenty minutes, and then setting the masticatory base aside, and chewing a portion of similar weight of my improved chewing gum for a period of six hours, and then setting the masticatory base aside, and at a later time again chewing each of the two gum residues, it will be found that the residue from the conventional gum is substantially flavorless and has no longer any trace of a sweet taste, whereas the residue from my improved gum will be substantially as sweet as it was after being chewed for the first twenty minutes, and its sweetness will be very clear and noticeable.

Although I may employ any of the 1-halogeno-2-amino-4-nitrobenzenes in the practice of my present invention, I prefer to use the 1-iodo-2-amino-4-nitrobenzene, because of its high sweetening power and its exceptionally low solubility in saliva, these two factors leading to its having a very long life in a chewing gum, with maintenance of a mild and pleasant flavor over a very long period of time. The 1-bromo-2-amino-4-nitrobenzene does not have as long an effective life, but has a particularly pleasant flavor. The 1-fluoro-2-amino-4-nitrobenzene has the lowest sweetening power and the shortest effective life, but is of interest as a potential source of fluorine to the body, as the compound is delivered into the saliva very slowly and regularly over a long period of mastication of the gum base.

In making chewing gum in accordance with my present invention, I follow the usual methods of manufacture, employing chicle or any of the commercial chicle substitutes and preferably employing a mixture of 25% of chicle and 75% of a rubber base chicle substitute. Because a large portion of the profit in commercial chewing gum is due to the flavoring agents used (these materials having a much lower "per pound" price than either chicle or chicle substitutes), I may add to my masticatory base in which has been incorporated a halogenoaminonitrobenzene any desired amounts of sugar, corn syrup, and additional flavoring materials, but in doing this it should be understood that the purpose is primarily to reduce the unit cost of manufacture of a unit of weight of the gum to meet competitive conditions, and to avoid prejudice on the part of the public to the small size of stick in which my new gum of equal chewing characteristics can be made. Since 80% of the weight of most commercial chewing gums is made up of water soluble flavoring agents that are "chewed out" completely in the first five to ten minutes of chewing, leaving only 20% of masticatory base, it will be recognized that I can make a stick of chewing gum which is equal in chewing characteristics and which is vastly superior both in flavor and in the long and uniform life of its flavor, that will initially weight only slightly more than $1/5$ as much as a stick of conventional chewing gum. This tiny stick of chewing gum will have just as much masticatory base, and very much more flavor, than a conventional stick of chewing gum, but it is doubtful that the public would take kindly to so small an initial stick of gum, or could be brought to understand, without very extensive advertising, that in this tiny stick of gum they would obtain just as much masticatory material and very much more flavor than they would in the conventional much larger stick of chewing gum "loaded" with some 80% of its weight of sugar and corn syrup, and that are very promptly dissolved from the gum in the first few minutes it is chewed. It is mainly for this reason that I may in the commercial application of my invention similarly add sugar, corn syrup and additional flavors to my product, but it should be recognized that for the use of the military, for which large quantities of chewing gum have been found to be not only a source of comfort to the soldier but also as a help to morale and desirable for other reasons, my new product without the addition of any quantities of corn syrup or sugar may have a quite special field of usefulness, in which its light weight and small bulk are actually advantageous.

As a specific example of my present invention, I will describe a procedure which I may follow in the manufacture of a chewing gum intended to have both a pleasant flavor and the therapeutic action of supplying the body with the minute amount of iodine, that is now recognized to be desirable as a "trace" element capable of reducing the incidence of goiter.

In a gum kettle, I place 25 lbs. of chicle and 75 lbs. of a commercial chickle substitute such as "Paloja" or "Chulicious" (together with softening agents if desired), and run steam through the jacket until the mixture of chicle and chicle substitute becomes very soft. To the softened mixture I then add 4 lbs. of 1-iodo-2-amino-4-nitrobenzene, and thoroughly incorporate. I then add 10 lbs. of corn syrup and 20 lbs. of sugar, and again incorporate thoroughly. The batch is then rolled and worked on a bed of powdered sugar until the desired consistency is produced.

As another example of my invention, I may place 50 lbs. of chicle and 50 lbs. of a commercial chicle substitute in a gum kettle, heat until the mixture of chicle and chicle substitute is very soft, and to the soft mixture I may add 3.5 lbs. of 1-bromo-2-amino-4-nitrobenzene and thoroughly incorporate. This mixture is then rolled out in the customary manner with powdered sugar until a sheet of the desired consistency and thickness has been obtained, and this sheet will then be cut up into pieces or "sticks" of gum of any desired size and shape.

In a similar manner, I may use the 1-fluoro-2-amino-4-nitrobenzene or the 1-chloro-2-amino-4-nitrobenzene. The amounts used may vary widely, but in general I prefer to make my masticatory base from a mixture varying from 1% to 10% of a 1-halogeno-2-amino-4-nitrobenzene and from 90% to 99% of chicle or a chicle substitute, or a mixture of chicle and chicle substitute. In manufacture, this masticatory base is later rolled and sheeted in powdered sugar, to which additional softening and flavoring materials may be added if desired, and in these rolling and sheeting operations sugar softening and flavoring materials may be taken up to an amount equal to or even greater than the weight of the masticatory base, and up to several times the weight of the masticatory base, and in general the cheaper the gum that is desired, the greater the amount of powdered sugar that it is allowed to take up in the sheeting operation.

By the term "masticatory hydrocarbon" as used in these specifications and in the claims, I mean natural chicle, purified chicle, and chicle substitutes such as pontianak or other natural rubber, or natural or artificial rubbers modified by the action of chlorine, oxygen, or other reagent to reduce their "rubberiness" and to increase their masticatory characteristics, and natural or artificial rubbers that have been mechanically worked or masticated until their natural elasticity has been reduced and they have been rendered plastic rather than elastic and rubbery. This definition also includes chicle substitutes made by either chemical action or mechanical action, or both types of action, on natural or artificial rubber, examples of such commercial chicle substitutes being "Polaja," "Chulicious," and the like. The term "masticatory hydrocarbon" also includes the usual softeners that form a part of most commercial types of chewing gum base.

It will be understood that many modifications may be made in the practice of my invention without departing from the scope of the disclosure as herein made, and accordingly no limitations should be placed upon my invention except such as are indicated in the appended claims.

What I claim is:

1. A chewing gum base comprising a masticatory hydrocarbon and a 1-halogeno-2-amino-4-nitrobenzene dissolved in the hydrocarbon.

2. A chewing gum base comprising a masticatory hydrocarbon and a 1-halogeno-2-amino-4-nitrobenzene dissolved in the hydrocarbon in the proportion of 1 to 10 parts by weight of the halogeno compound for 100 parts total weight of the two ingredients.

3. A chewing gum comprising the base described in claim 1 and sugar as an additional sweetening agent.

4. A chewing gum base comprising a masticatory hydrocarbon and 1-iodo-2-amino-4-nitrobenzene dissolved in the hydrocarbon.

5. A chewing gum base comprising a masticatory hydrocarbon and 1-chloro-2-amino-4-nitrobenzene dissolved in the hydrocarbon.

6. A chewing gum base comprising a masticatory hydrocarbon and 1-fluoro-2-amino-4-nitrobenzene dissolved in the hydrocarbon.

WALTER O. SNELLING.

REFERENCES CITED

The following references are of record in the file of this patent:

UNITED STATES PATENTS

| Number | Name | Date |
|---|---|---|
| 410,940 | Sommer | Sept. 10, 1889 |

OTHER REFERENCES

"The Chemical Senses," by Moncrieff, Leonard Hill Limited, 17 Stratford Place, W. I., London, 1944, pages 248 and 262.